United States Patent [19]

Russell

[11] 4,387,171

[45] * Jun. 7, 1983

[54] UNSATURATED POLYESTER RESINS

[75] Inventor: Robert F. Russell, Wellingborough, England

[73] Assignee: Scott Baker Company Limited, England

[*] Notice: The portion of the term of this patent subsequent to Aug. 25, 1998, has been disclaimed.

[21] Appl. No.: 294,928

[22] Filed: Aug. 21, 1981

[30] Foreign Application Priority Data

Apr. 23, 1981 [GB] United Kingdom ............... 8112652

[51] Int. Cl.$^3$ ........................................... C08L 67/06
[52] U.S. Cl. ................................... 523/518; 525/43; 525/49; C08G/63/76
[58] Field of Search .................. 525/43, 49; 523/518

[56] References Cited

U.S. PATENT DOCUMENTS

| | | | |
|---|---|---|---|
| 3,553,294 | 1/1971 | McGary et al. | 525/49 |
| 3,875,094 | 4/1975 | Schroeter et al. | 525/49 |
| 4,269,745 | 5/1981 | Neumann | 525/49 |
| 4,285,845 | 8/1981 | Russell | 523/518 |

*Primary Examiner*—Wilbert J. Briggs, Sr.
*Attorney, Agent, or Firm*—Townsend and Townsend

[57] ABSTRACT

An unsaturated halogenated or non-halogenated polyester resin composition for open lay-up moulding and containing styrene as an agent for cross-linking during curing additionally contains 0.1 to 5% by weight, based on the total weight of the composition, of at least one $C_{18-40}$ α-olefine compound which is theoretically capable of taking part in the cross-linking reaction.

When the composition contains a non-halogenated polyester resin, then the α-olefine compound itself serves to restrict styrene evaporation from the composition.

For halogenated polyester resin compositions, the α-olefine, although not usually by itself providing such a marked restriction of styrene evaporation, does allow incorporation into the composition of a waxy compound in an amount sufficiently large to achieve the desired styrene evaporation restriction without deterioration of the adhesion properties of the composition during lay-up.

12 Claims, No Drawings

UNSATURATED POLYESTER RESINS

FIELD OF THE INVENTION

This invention relates to unsaturated polyester resin compositions and in particular to resin compositions containing additives which provide reduction of styrene monomer emission during moulding by ambient temperature open wet lay-up processes.

BACKGROUND OF THE INVENTION

The addition of paraffin wax (100 ppm) to polyesters has been known for many years to prevent air inhibition of the open surface of mouldings on cure (B.P.713,332). More recently a need has arisen on environmental grounds to reduce the evaporation of styrene monomer from the surface of a laminate in the interval between lay-up and cure. This can be achieved by the incorporation of higher levels of paraffin wax, e.g. 1000 ppm, but this concentration of wax can have several drawbacks:

(a) wax can separate from the liquid resin when it is stored at low temperatures,
(b) the layer of wax which comes to the surface can interfere with the adhesion between one layer of laminate and the next, especially where there is a delay between lay-up and cure and the surface is resin-rich.

In order to overcome these disadvantages, it has been proposed to incorporate small quantities of a straight chain hydrocarbon, e.g. n-octane or the use of a surfactant such as polyoxyethylene sorbitan fatty acid esters (German Offenlegungsschrift No. 2554930).

Neither of these methods has been particularly successful. For example 2% n-octane lowers the heat deflection temperature of the cured resin and imparts a milky appearance to the laminate.

U.S. patent application No. 63134 filed Aug. 3, 1979 by the present inventor is also directed to this problem of enabling higher quantities of wax to be added without incurring the abovementioned disadvantages. There, a terminally unsaturated compound capable of taking part in the cross-linking reaction is included to allow more wax to be incorporated in the composition. There is a disclosure, by way of example, of the use of an $\alpha$-unsaturated olefine having 10 carbon atoms as such a compound.

Whilst this method works well with many resins, our results now show that for some unsaturated polyester resins based on halogenated acids such as chlorendic acid, the effect is not so marked.

SUMMARY OF THE INVENTION

We now find surprisingly that, for polyester resins based on such halogenated acids, the disadvantages associated with incorporating waxes can be overcome to good effect by additionally incorporating in the polyester resin composition small quantities of an $\alpha$-olefine having a particularly long chain, i.e. a $C_{18-40}$, preferably a $C_{18-24}$, $\alpha$-olefine. In some cases wax need not be present.

Furthermore, we also find surprisingly that, for polyester resins which are not based on halogenated acids, a marked restriction of styrene emission can be achieved by merely incorporating into the polyester resin composition such a long chain $\alpha$-olefine without the addition of any wax at all.

An unsaturated polyester resin composition in accordance with the invention contains an unsaturated polyester resin selected from halogenated and non-halogenated said resins, styrene as an agent for cross-linking during curing and a small quantity, preferably 0.1 to 5% by weight of at least one compound which is theoretically capable of taking part in the cross-linking reaction, which compound is a $C_{18-40}$ $\alpha$-olefine.

When the unsaturated polyester resin is a halogenated said resin, the composition will usually additionally contain a waxy compound. Examples of suitable waxy compounds are stearyl stearate and paraffin wax.

For the non-halogenated resins, a marked restriction in styrene emission is achieved by including the abovementioned long chain $\alpha$-olefine alone, i.e. without addition of wax. For halogenated resins, the $\alpha$-olefine will not by itself usually provide such a marked restriction of styrene emission, but will allow incorporation of a waxy compound in an amount sufficiently large to achieve the desired styrene emission restriction without incurring the expected disadvantages associated with the incorporation of such large amounts of waxy compound.

In unsaturated polyester resin compositions in accordance with the invention, the presence of a range of solid $\alpha$-olefines serves to:

(a) reduce styrene emission from laminates, and
(b) prevent air inhibition of the surface of the laminate.

The advantages are obtained without loss of interlaminar adhesion and, in addition to having good interlaminar adhesion, the compositions also have good shelf stability.

The $\alpha$-olefines are terminally unsaturated compounds of 18–40 C atoms, preferably 18–24 C atoms, which may be linear or branched chain and may be used in quantities of up to 1% based on the total weight of the composition. Single compounds can be employed, for example, octadec-1-ene, and tetracos-1-ene, or mixtures of several different chain lengths, e.g. 21–28 C atoms. Such materials are commercially available as Gulftene ™ 24–28. The $\alpha$-olefine can be admixed with the resin with stirring and warming.

Typical polyesters which can be made up into resin compositions of the invention are those in which the acid moiety is derived from phthalic acid or anhydride, isophthalic acid or anhydride, maleic acid or anhydride or, for halogenated polyesters, chlorendic acid (HET acid) or anhydride or tetrahalophthalic anhydrides wherein the halogen is chlorine or bromine and in which the glycol moiety is derived from ethylene glycol, propylene glycol, diethylene glycol or, for halogenated polyesters, dibromoneopentyl glycol.

The halogenated polyesters may be halogenated in their acid or alcohol moieties or both.

The polyester may include other moieties derived from unsaturated monomers, for example, dicyclopentadiene.

The styrene used as a vehicle will in a commercial situation by styrene itself, but in principle substituted styrenes may be used.

For polyester resins based on non-halogenated acids, where no wax is additionally included, the amount of $\alpha$-olefine present is preferably 0.1–1%, more preferably 0.3–0.6% based on the total weight of the composition. These are also the preferred ranges for polyester resins based on halogenated acids if wax is added. In some cases wax may not need to be added.

The amount of wax which is preferably added to polyester resin compositions based on halogenated resins is higher for some such resins than others, but is in general within the range 0.05–0.3% based on the total weight of the composition.

For polyester resins based on dibromoneopentyl glycol, the preferred amount is 0.075–0.1%, while for those based on chlorendic acid, the preferred amount is 0.25%.

These amounts of component allow the use of quantities of paraffin wax and/or similar ingredient much larger than those which would have been needed merely for the prevention of air inhibition and yet such large amounts can be incorporated in the composition without any of the previously mentioned disadvantages associated with these known ingredients.

DESCRIPTIONS OF PREFERRED EMBODIMENTS

Preferred compositions embodying the invention and their preparation will now be described in more detail with reference to the following Examples in which Examples 1–3 show the preparation of non-halogenated polyester resin compositions which do not contain wax, Example 4 shows the preparation of a halogenated polyester to be made up into a resin composition and Examples 5–11 show the preparation of halogenated polyester resin compositions containing wax.

These Examples illustrate the excellence of such compositions.

EXAMPLE 1

0.5% pbw Gulftene ® 24-28 was added to Crystic ® 406PA (a commercially available polyester resin based on phthalic anhydride, maleic anhydride, propylene glycol, diethylene glycol and ethylene glycol in styrene) and dissolved by stirring and warming to 60° C. On cooling to room temperature an evaporation test carried out by continuously weighing a laminate made from the mixture gave a weight loss of 20 g/m$^2$ after 30 minutes compared to 50 g/m$^2$ after 30 minutes for the unmodified Crystic ® 406PA.

EXAMPLE 2

0.5% Gulftene ® 24-28 was dissolved in Crystic ® 491PA (a commercially available polyester resin based on isophthalic anhydride, maleic anhydride, propylene glycol and ethylene glycol) using a similar technique to that described in Example 1.

A laminate made from this modified resin gave a weight loss of 10 g/m$^2$ after 30 minutes compared to 80 g/m$^2$ for the unmodified Crystic ® 491PA. No loss of adhesion between layers was noted even after a 24 hour delay period between successive laminations.

EXAMPLE 3

0.5% Gulftene ® 24-28 was dissolved in a general purpose isophthalic acid based resin. The mixture had a viscosity at 25° C. of 4.4 poise at a shear rate of 4500 sec$^{-1}$ and a viscosity of 9.1 poise at a shear rate of 37.35 sec$^{-1}$.

The above Examples show that non-halogenated polyester resin compositions containing high, solid, α-olefines although not containing a wax, still exhibit efficient restriction of styrene evaporation, and excellent adhesion.

EXAMPLE 4 (Basic Halogenated Polyester Resin)

Chlorendic acid (1.0 mole), neopentyl glycol (3.1 moles) and maleic anhydride (2.0 moles) were reacted under a stream of inert gas at 165° C. until an acid value of 24–28 mg KOH/g was reached. The cooled resin was blended with styrene monomer containing hydroquinone (35 ppm) as inhibitor and the final styrene solution of polyester contained 35–38%, styrene by weight.

EXAMPLES 5–10

Various levels of paraffin wax (mp 52°–54° C.) and C$_{20-24}$ α-olefine (Gulftene ® 20-24) were incorporated into the resin and the styrene loss measured over periods of 30 minutes. Laminates were made using 500 g of compounded resin + 10 g methyl ethyl ketone peroxide and 7.5 g cobalt octoate (1% Co). The resin was used to impregnate 0.5 sq.m. of glass mat (450 g/m$^2$). After 24 hours a further layer of glass mat was laminated onto the first using the same quantities of material. After a further period of 24 hours the laminate was tested for inter-laminar adhesion by a subjective peel test and note was made of the effort required on a scale of 0 (no adhesion) to 10 (best adhesion) and the fibre pull out from the separated surface on a scale 0 (none) to 20 (best).

The results are shown in the Table below.

| Example | Wax (ppm) | Olefine (%) | Evaporation Rate (g/m$^2$) 10mins | Evaporation Rate (g/m$^2$) 30mins | Peel Adhesion Effort | Peel Adhesion Fibre |
| --- | --- | --- | --- | --- | --- | --- |
| 5 | — | — | 14 | 42 | 8 | 15 |
| 6 | 2000 | — | 7 | 9 | 1 | 0 |
| 7 | 2000 | 0.35 | 11 | 22 | 8 | 14 |
| 8 | 2500 | 0.3 | 5 | 6 | 3 | 2 |
| 9 | 2500 | 0.4 | 9 | 14 | 8 | 15 |
| 10 | 2500 | 0.5 | 8 | 11 | 8 | 14 |

EXAMPLE 11

An unsaturated polyester resin was synthesised from 2.86 moles dibromoneopentyl glycol, 1.54 moles ethylene glycol, 4 moles maleic anhydride and 1 mole dicyclopentadiene. The maleic anhydride, dibromoneopentyl glycol and ethylene glycol together with 2 moles of water and 4% by weight of the total reactant charge of toluene as azeotropic solvent were charged to a glass reactor equipped with a stainless steel stirrer and an azeotropic distillation column. The mixture was warmed to 80°C. in a stream of nitrogen gas and held at this temperature for 20 minutes. The dicyclopentadiene was then added and the temperature raised to 130° C. After 2½ hours at 130° C., when the dicyclopentadiene addition reaction was complete, the temperature was raised to 170° C. and condensation continued until the acid value dropped to 35mg KOH/g. The resin was vacuum distilled to stip out the toluene and 50 p.p.m. hydroquinone added as inhibitor. The resulting resin was dissolved in styrene monomer to yield a resin solution containing 35% styrene.

To this resin solution were added 1000 p.p.m. paraffin wax (mp 52°–54° C.) and 0.4% C$_{20-24}$ α-olefine (Gulftene ®20-24). Styrene losses over periods of 10 and 30 minutes were 6g/m$^2$ and 10g/m$^2$ as compared with 12g/m$^2$ and 30g/m$^2$ /for a resin without wax and α-olefine. The peel adhesion results on the same scale as Examples 5–10 were 7 and 7 respectively.

The above Examples 5-11 show that halogenated polyester resin compositions embodying the invention may contain large quantities of wax to achieve efficient restriction of styrene evaporation and yet still exhibit excellent interlaminar adhesive properties when cold laid-up in open mould.

We claims:

1. An unsaturated polyester resin composition for ambient temperature open lay-up moulding which contains
    an unsaturated polyester resin selected from halogenated and non-halogenated said resins,
    styrene as an agent for cross-linking during curing and a small quantity of at least one compound which is theoretically capable of taking part in the cross-linking reaction, which compound is a $C_{18-14}$ α-olefine.

2. A polyester resin composition according to claim 1, wherein when the resin is a non-halogenated resin the amount of the said terminally unsaturated α-olefine(s) present in the composition is from 0.1 to 1% inclusive by weight based on the total weight of the composition.

3. A polyester resin composition according to claim 2, wherein the said amount is from 0.3 to 0.6% inclusive.

4. A polyester resin composition according to claim 1, wherein the α-olefine contains from 18-24 -carbon atoms inclusive.

5. A polyester resin composition according to claim 1, which contains a plurality of terminally unsaturated α-olefines each containing from 18 to 40 carbon atoms inclusive.

6. A polyester resin composition according to claim 5, wherein the said plurality of terminally unsaturated α-olefines is provided by a commercially available mixture of said α-olefines with a carbon atom content lying in the range 21 to 28 carbon atoms inclusive.

7. A polyester resin composition according to claim 1, wherein the polyester resin is a non-halogenated said polyester resin and the composition is free of waxy compound.

8. A polyester resin composition according to claim 1, wherein the polyester resin is a holgenated said polyester resin and the composition additionally contains a waxy compound.

9. A polyester resin composition according to claim 8, wherein the amount of said waxy compound present in the composition is from 0.05 to 0.3% based on the weight of the total composition.

10. A polyester resin composition according to claim 1, wherein the unsaturated polyester resin is a halogenated said resin and the composition is free of said waxy compound.

11. In an unsaturated polyester resin composition for ambient temperature open lay-up moulding in which the unsaturated polyester resin is selected from non-halogenated and halogenated said resins and in which composition styrene is present as an agent for cross-linking during curing, the improvement comprising the presence of a small quantity of at least one $C_{18-40}$ α-olefine compound which is theoretically capable of taking part in the cross-linking reaction so as to serve, in a composition containing a said non-halogenated polyester resin, to restrict styrene evaporation from the said composition and, in a said composition containing a said halogenated polyester resin, to allow a waxy compound to be additionally present in an amount which restricts styrene evaporation from said composition.

12. A polyester resin composition according to claim 8, wherein the waxy compound is selected from stearyl stearate and paraffin wax.

* * * * *

UNITED STATES PATENT AND TRADEMARK OFFICE
CERTIFICATE OF CORRECTION

PATENT NO. : 4,387,171

DATED : June 7, 1983

INVENTOR(S) : Robert F. Russell

It is certified that error appears in the above-identified patent and that said Letters Patent is hereby corrected as shown below:

On the title page
The name of the assignee should read as follows:

Scott Bader Company Limited

Signed and Sealed this

Twenty-seventh Day of December 1983

[SEAL]

Attest:

GERALD J. MOSSINGHOFF

Attesting Officer

Commissioner of Patents and Trademarks